Figure 1:
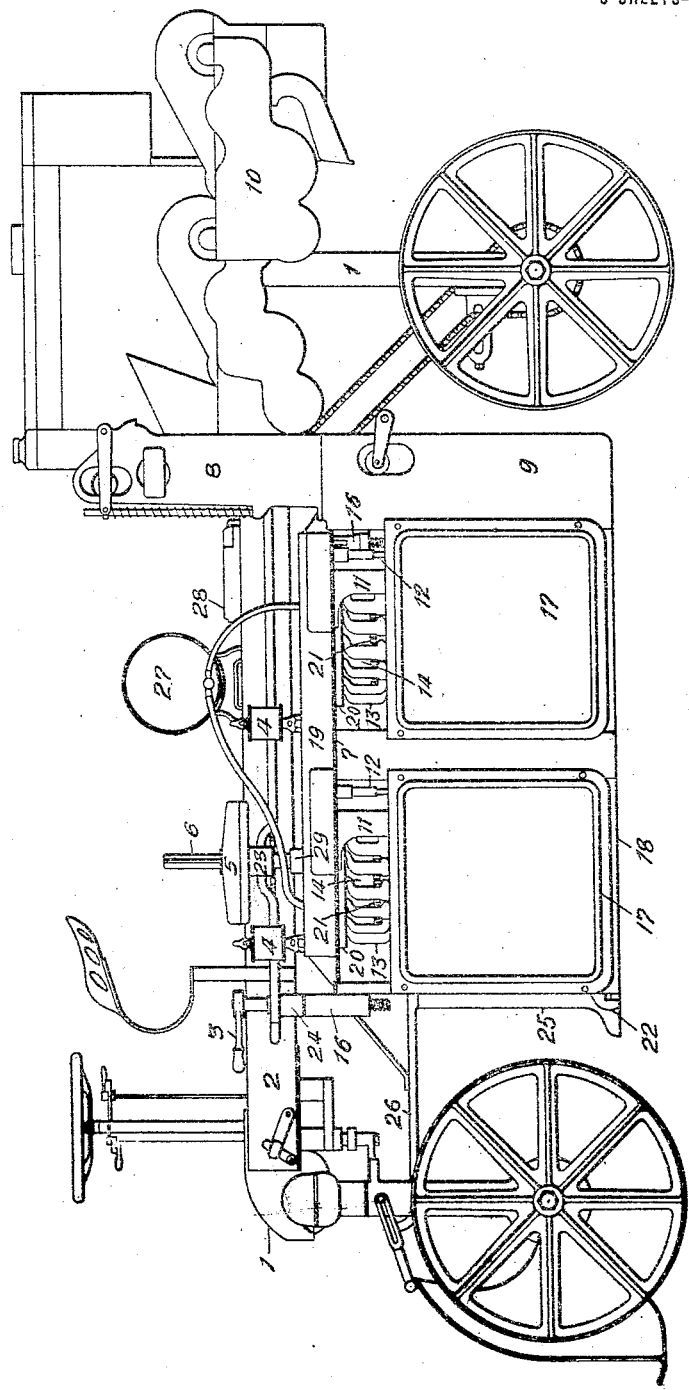

B. C. CALDERWOOD.
PICKING MECHANISM FOR COTTON PICKING MACHINES.
APPLICATION FILED APR. 30, 1913.

1,161,611.

Patented Nov. 23, 1915.
6 SHEETS—SHEET 1.

Witnesses

Inventor
Benjamin Bushtree Calderwood

B. C. CALDERWOOD.
PICKING MECHANISM FOR COTTON PICKING MACHINES.
APPLICATION FILED APR. 30, 1913.

1,161,611.

Patented Nov. 23, 1915.
6 SHEETS—SHEET 2.

WITNESSES:

INVENTOR
Benjamin Crabtree Calderwood
Edward P. Beach
ATTORNEY

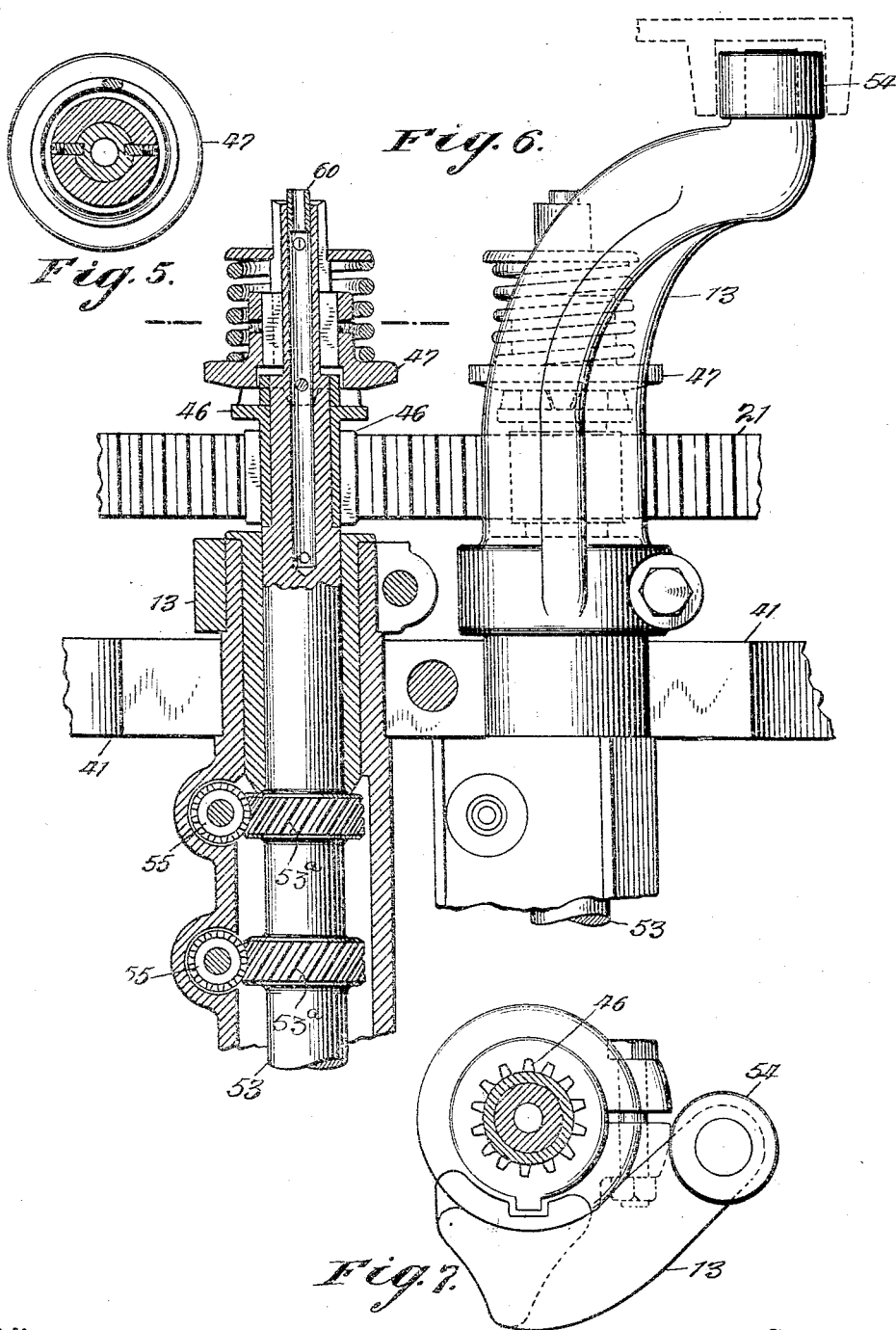

B. C. CALDERWOOD.
PICKING MECHANISM FOR COTTON PICKING MACHINES.
APPLICATION FILED APR. 30, 1913.
1,161,611.
Patented Nov. 23, 1915.
6 SHEETS—SHEET 6.
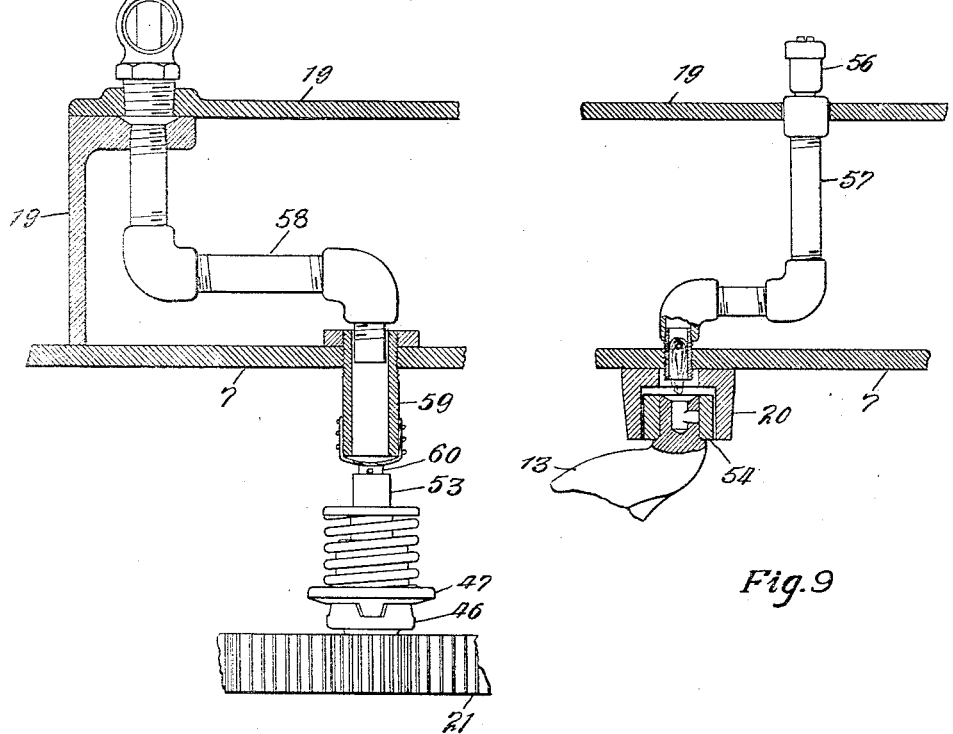

UNITED STATES PATENT OFFICE.

BENJAMIN CRABTREE CALDERWOOD, OF VALLEY FALLS, RHODE ISLAND, ASSIGNOR TO PRICE-CAMPBELL COTTON PICKER CORPORATION, OF NEW YORK, N. Y., A CORPORATION OF DELAWARE.

PICKING MECHANISM FOR COTTON-PICKING MACHINES.

1,161,611.

Specification of Letters Patent.　　Patented Nov. 23, 1915.

Application filed April 30, 1913.　Serial No. 764,524.

*To all whom it may concern:*

Be it known that I, BENJAMIN CRABTREE CALDERWOOD, a citizen of the United States, residing at Valley Falls, in the county of Providence and State of Rhode Island, have invented certain new and useful Improvements in Picking Mechanisms for Cotton-Picking Machines, of which the following is a specification.

My invention relates to improvements in picking mechanisms for cotton-picking machines whereby four drums are used, arranged two-and-two on opposite sides of the vehicle, each having therein a picking mechanism and all picking mechanisms acting simultaneously and in unison.

My forward drums are driven by means of shafts sliding vertically in bevel gears rotating in a horizontal plane directly above and on the same axis as the drum centers, the bevel gears in turn being rotated by bevel pinions keyed to a cross shaft which is driven by a bevel pinion mounted on a shaft running parallel with the main frames.

A sprocket is mounted to each of the forward drum shafts, and a chain engages with a sprocket in the rear drum center. As the action of each and all of the four drums with their inclosed mechanism is exactly alike, I will hereafter speak of them as one unit. The entire picking mechanism is suspended from the top drum plate, which in turn is suspended from the main vehicle frame by means of drum hangers adjustable vertically through the action of elevating screws.

My picking mechanism consists of a fixed circular drum center bolted to the under side of the top drum plate, of a cam mounted thereon and held in position by a screw through the top drum plate. A lifting cam in the form of a circular arc with a compound angled incline at either end is also bolted to the drum center, and acts, in conjunction with a mechanism to be mentioned later, for the purpose of stopping and starting rotary motion of picking fingers.

My picking fingers which are socketed into combined finger sockets and spiral pinions rotating at equidistant points in the carriers, are rotated through a spiral gear shaft, placed vertically inside each carrier and rotating in a horizontal plane, engaging with aforesaid combined finger sockets and spiral pinions. Keyed to and sliding in a vertical reciprocating plane on this shaft, and at a point well above the topmost part of the carriers, is a clutch having an intermittent engagement with a combined clutch-and-pinion rotating freely on the same shaft, and directly under the sliding clutch. The combined clutch-and-pinion meshes with a fixed circular gear ring secured to the drum center heretofore mentioned, and as it revolves around the drum center, is rotated by the action of the gear teeth in the ring, and in turn rotates the keyed sliding clutch.

At a predetermined period this clutch rises and rides upon the lifting cam mentioned in a previous paragraph, thereby throwing the clutch teeth out of engagement, allowing the combined clutch-and-pinion to rotate freely on the shaft, which remains stationary in relation to rotary motion until the clutch rides off the lifting cam, when the rotary motion of the shaft is resumed.

The carriers, with their inclosed mechanism, are stepped and pivoted at their lower end into a bottom carrier wheel keyed to a vertical shaft, where their upper ends are inclosed in capped bearings in an upper carrier wheel keyed to the same shaft, both carrier wheels and shaft rotating in a horizontal plane.

A cam arm at the top end of the carriers and directly above the upper carrier wheel, engages with the cam heretofore mentioned and causes the carriers to swing with a partial rotary or oscillating motion as they revolve around the drum centers, thereby swinging the picking fingers into the various positions for picking, stripping off the cotton and passing through the finger-cleaning brushes, the cotton once stripped from the picking fingers by the mechanism designed for that purpose is thrown onto an elevator belt by the action of a spike roller, whence it is conveyed to the cleaners and thence into the baskets.

The rotation of my carrier wheels is in a direction reverse to the travel of the vehicle, and the relation of linear speed is such that the carriers travel rearward at the same speed that the vehicle travels over the ground, or in other words, the picking fingers assume a fixed position in the plant until time for withdrawal and stripping.

The objects of my invention are: first, to provide positive and efficient lubrication for each and every moving part; second, to provide means for making all units of the picking mechanism accessible and interchangeable; and third, to furnish means whereby cotton may be picked, cleaned and placed in convenient receptacles without injury to squares, blooms, unopened bolls or foliage.

Figure 2:
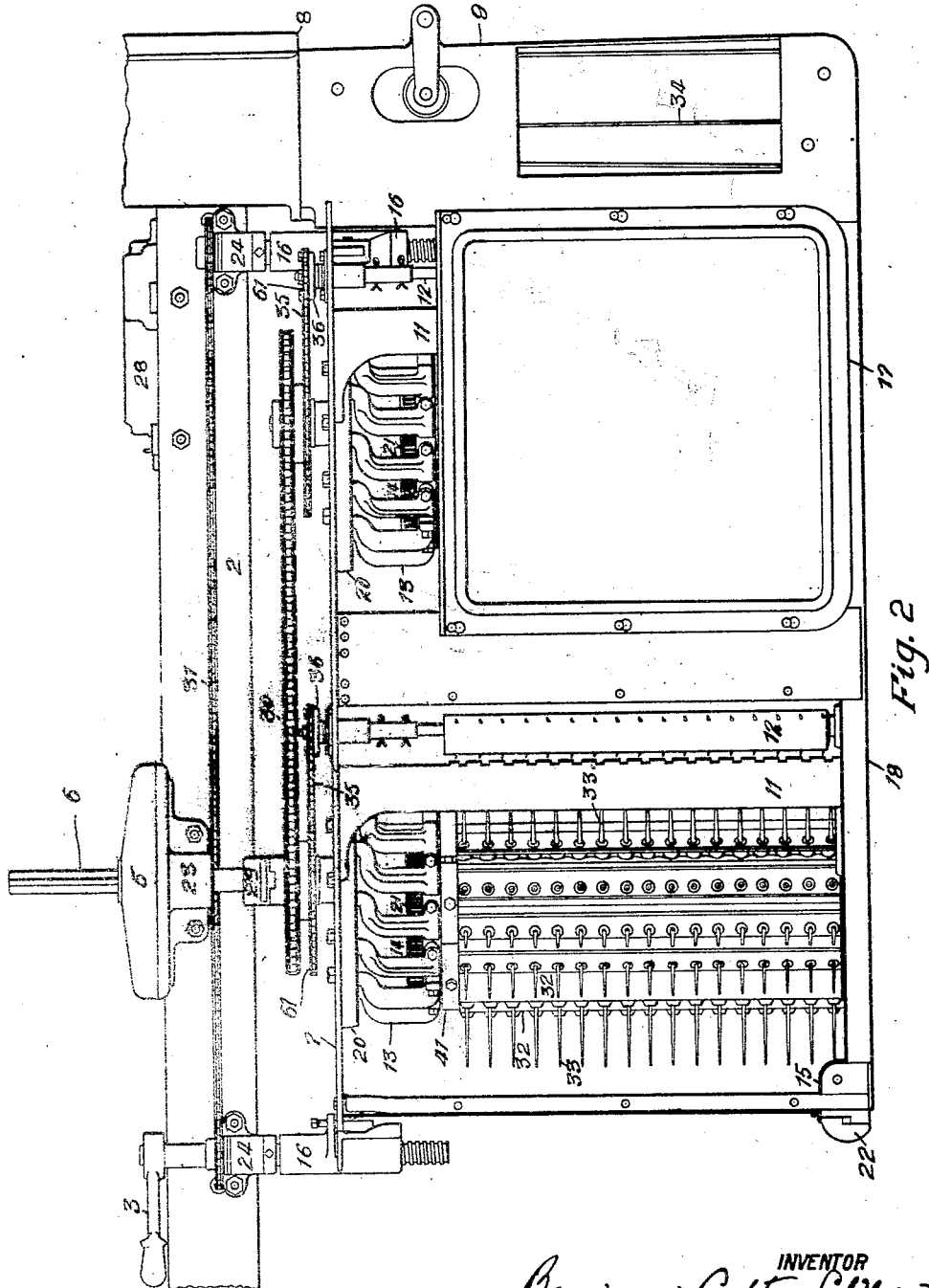
Figure 3:
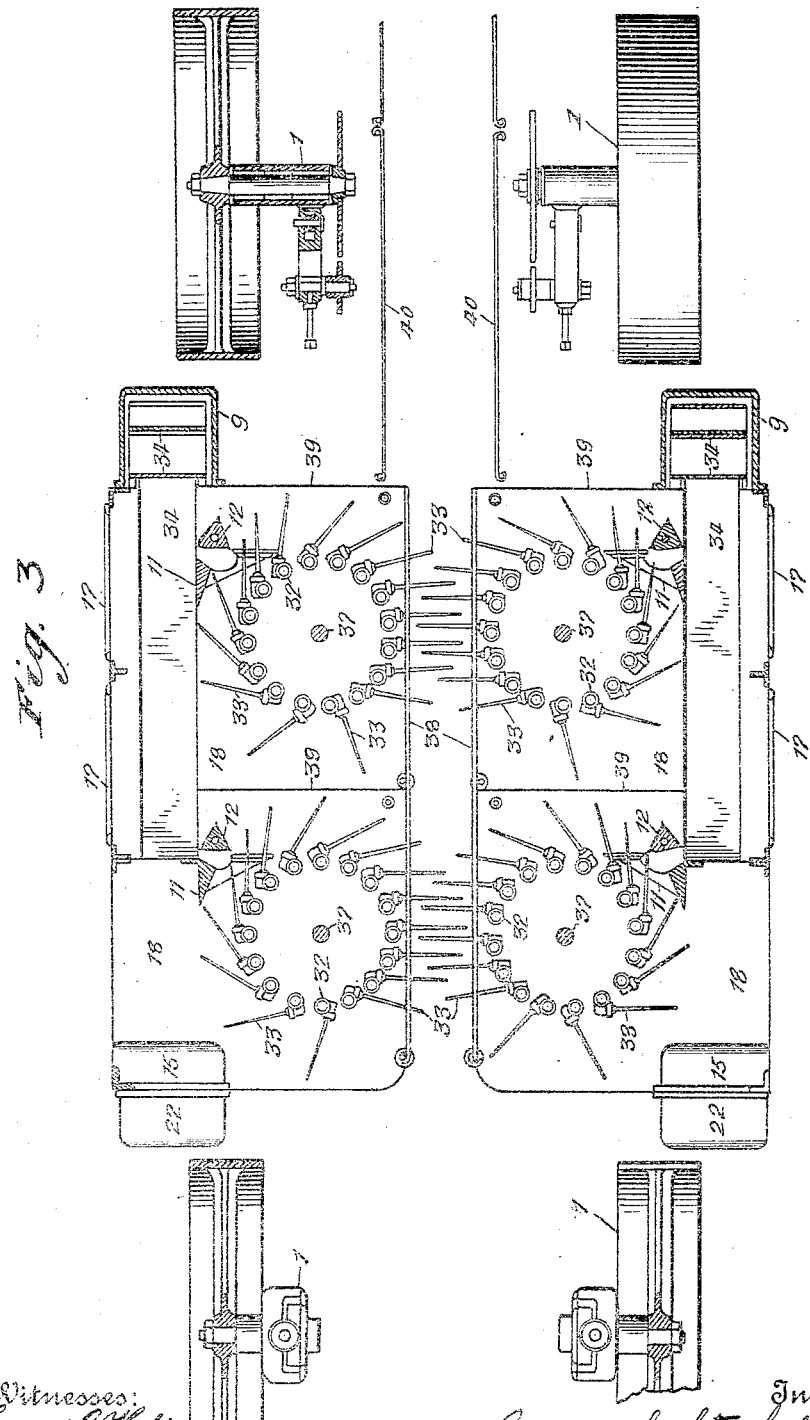
Figure 4:
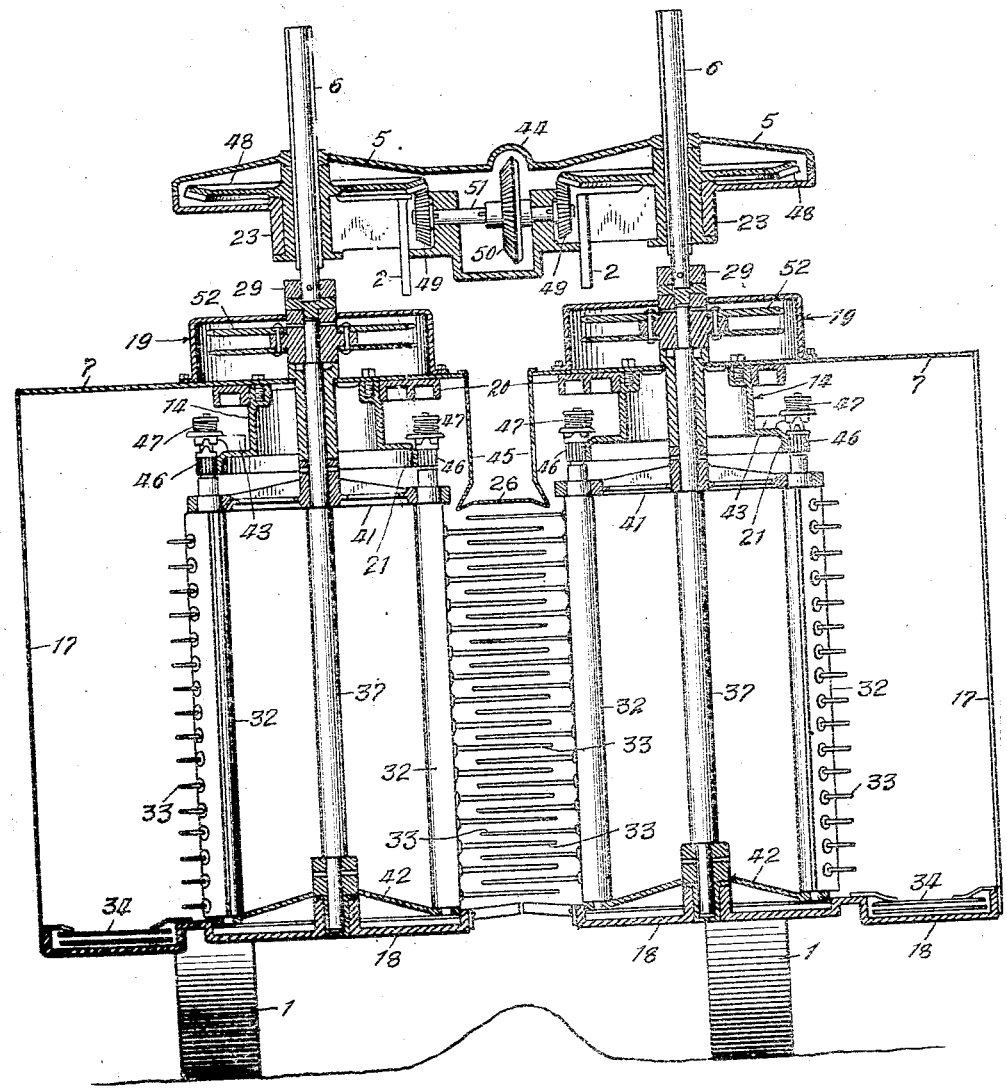

Referring to the accompanying drawings forming a part hereof, Figure 1 is a side view of the cotton-picking machine illustrating the method by which the picking mechanism is suspended from a vehicle, as well as the manner in which the cotton cleaners act in conjunction with the picking mechanism. Fig. 2 is a side view of the left-hand drum, with the door to the left-hand forward drum removed to show the carriers and picking fingers. In this view are also shown the cam arms keyed and clamped to the carriers and in engagement with the main cam. The fixed circular gear ring is also shown, also the stripping mechanism, and a portion of the elevating belts. The manner in which the picking mechanism is suspended from the top drum plate is also shown, and the means whereby this in turn is suspended from the main frame of the vehicle by the drum hangers and elevating screws, these latter actuated by the wrench, sprockets, and chain shown. The manner of driving the various units of the picking mechanism is illustrated by the chain and sprocket drives from forward to rear unit, and from the drum centers to spike rollers. Fig. 3 is a horizontal section through the center line of the vehicle wheels, illustrating the various positions of the picking fingers while engaging the plant, passing through the stripping mechanism and translating into position for reëntering the plant. The method of elevating the cotton is shown in portion, also the means provided for propelling the cotton onto the elevating belts. Fig. 4 is a vertical section through the forward drum centers, illustrating the method of driving the various units from the cross shaft in the drum transmission case; the section also shows the manner in which the carriers are placed in the capped bearing on the upper carrier wheel, stepped and pivoted into the bottom carrier wheel, thereby permitting a partial rotary or oscillative motion hitherto referred to. This view also shows the relation of the main translating cam, circular gear ring and the lifting cam, to the fixed circular drum center, and of all these units to the top drum plate. Fig. 5 is a horizontal section through the spiral shaft clutch. Fig. 6 is a vertical section through one of the carriers, showing the inclosed spiral shaft in engagement with the combined finger sockets and spiral pinions. The part of the spiral shaft that is above the carriers is in section, showing the various relations of the free running combined pinion-and-clutch to fixed circular gear ring and sliding clutch; this latter keyed to the shaft. The hole in the center of the spiral shaft permits of lubricating the interior of the carriers. Fig. 7 is a top view of a cam arm in position on the carriers. Fig. 8 is a section through the sprocket covers and top drum plate, showing my method of lubricating the carriers by means of oil gatherers wiping the oil from a retainer having a wick at its outlet end; and Fig. 9 illustrates the manner of conveying lubrication to the cam arm rollers.

In the drawings, 1 is the vehicle, 2 the main frames, from which are suspended the drums, 3 the drum lifting mechanism, 4 the sight feed oil cups for lubricating the carriers, 5 the cover for the drum bevel gears, and 6 the upper drum shafts.

7 are the top drum plates, 8 the upper elevator section, and 9 the lower elevator section.

10 are the cleaners, through which the cotton passes before being deposited into the baskets, 11 the strippers, and 12 the spike rollers, both these latter constituting the stripping mechanism.

13 are the cam arms which impart the oscillating motion to the carriers, 14 the fixed circular drum centers around which revolve the carriers with their inclosed mechanism, and 15 the inner front elevator belt pulley cover.

16 are the drum hangers, 17 the drum doors, 18 the bottom drum plates, and 19 the covers for the upper drum plates, which covers also act as dust guards for the various chains, sprockets and other mechanisms placed on the top side of the drum plates.

20 is the main cam, which, in conjunction with the cam arms, imparts the oscillating motion to the carriers, 21 the fixed circular gear ring, around which revolves the combined clutches-and-pinions on the spiral gear shafts.

22 is the outer front elevator belt pulley cover, 23 the drum shaft brackets, 24 the drum hanger brackets, 25 the plant gatherers, and 26 the plant deflector (Fig. 4).

27 is the finger fluid tank, 28 the transmission case, 29 the drum shaft couplings, which join by a floating member the upper and lower drum shafts, 30 the rear drum drive-chain, and 31 the drum elevating chain.

32 are the carriers, which contain the spiral shafts and the picking fingers 33.

34 are the elevator belts, 35 the chains for spike roller drive, and 36 the spike roller couplings, which join the spike roller to the sprockets.

37 are the lower drum shafts, to which are keyed and with which rotate the upper and lower carrier wheels, and 38 the slat rods which prevent the cotton plant from gaining access to the interior of the drums.

39 is the upright drum plates, the middle and rear ones of which serve to retard the cotton when propelled by the spike rollers, thereby imparting a snappy throw to the same, and insuring its reaching the elevator belts; and 40 are the rear plant hoods, which inclose the plant until the active mechanism has passed by.

41 is the upper carrier wheel, which is keyed to the same shaft and rotates simultaneously with the lower carrier wheel 42.

43 is the lifting cam mentioned in conjunction with the mechanism for starting and stopping the rotary motion of the picking fingers, 44 the middle cover for the drum drive transmission case, and 45 the top plant deflector, which holds the plant in the proper angle while the picking mechanism is passing through, and prevents the foliage from winding around the shafting.

46 are the combined clutches-and-pinions, which engage with the fixed circular gear ring while rotating freely upon the spiral shafts, and 47 the keyed sliding clutches which, at fixed periods, engage with aforesaid combined clutches-and-pinions, thereby causing the spiral shafts to rotate or cease rotating.

48 are the bevel gears on the upper drum shafts, 49 the intermeshing pinions on the drum drive cross shaft, 50 the bevel gear on the cross shaft, and 51 the cross shaft for the drum drive. Gear 50 meshes with a lengthwise-extending transmission shaft from the engine, but neither the engine nor the transmission shaft is shown.

52 are the drum drive sprockets, which drive the rear drums, 53 the spiral gear-carrying shafts in the carriers, 53ª the spiral gears on the shaft 53, 54 the rollers on the cam arms, which minimize friction between the cam arms and the cam 20, 55 the spiral pinions in the carriers, which also act in the capacity of sockets for the fingers, and are rotated by the spiral gear shaft 53, and 56 the oiler to cam arms, and 57 the oil feed pipe to cam arms.

58 is the feed pipe for the lubrication of the carriers, and 59 the retainer having a wick on its lower or outlet end, from which the oil gatherers 60 deliver their equal share of lubricant.

61 is the sprocket by which the spike rollers are rotated for propelling the stripped cotton to the elevator belts.

What I claim is,—

The combination, in a picking mechanism for cotton-picking machines, of a series of carriers having severally inclosed therein a spiral gear shaft for transmitting rotary motion to picking fingers; the shaft; a clutch slidably mounted on the shaft with a vertical reciprocating motion; a combined clutch-and-pinion keyed to the shaft and engaging with a fixed circular gear mounted on a fixed circular drum center; the sliding clutch engaging with the aforesaid combined clutch-and-pinion, and at regular and predetermined periods rising and riding upon a lifting cam mounted on the fixed drum center, thereby throwing the clutch teeth out of engagement and causing cessation of rotary motion of picking fingers.

In testimony whereof I have hereunto set my hand in the presence of two subscribing witnesses, this 25th day of April 1913.

BENJAMIN CRABTREE CALDERWOOD.

Witnesses:
G. BLAKE,
WILLIAM J. DODGE.